(12) United States Patent
Tsubata et al.

(10) Patent No.: US 6,246,362 B1
(45) Date of Patent: Jun. 12, 2001

(54) PORTABLE GPS SIGNAL RECEIVING APPARATUS

(75) Inventors: Keisuke Tsubata; Hiroshi Odagiri; Chiaki Nakamura; Kazumi Sakumoto, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/046,923

(22) Filed: Mar. 24, 1998

(30) Foreign Application Priority Data

| | | |
|---|---|---|
| Mar. 25, 1997 | (JP) | 9-072264 |
| Mar. 31, 1997 | (JP) | 9-081671 |
| Jan. 20, 1998 | (JP) | 10-008861 |

(51) Int. Cl.[7] .............. G01S 5/02; H04B 7/185
(52) U.S. Cl. ............. 342/357.08; 342/419; 701/213
(58) Field of Search ............. 342/357.08, 419; 701/213

(56) References Cited

U.S. PATENT DOCUMENTS 5,148,002 * 9/1992 Kuo et al. .
5,270,936 * 12/1993 Fukushima et al. .
5,583,776 * 12/1996 Levi et al. .
5,905,460 * 5/1999 Odagiri et al. ............. 701/213

* cited by examiner

Primary Examiner—Theodore M. Blum
(74) Attorney, Agent, or Firm—Adams & Wilks

(57) ABSTRACT

A GPS signal receiving section measures a Doppler frequency of a carrier wave to output a three-dimensional velocity vector to a CPU 100. The CPU 100 calculates a cumulative distance from a signal receiving interval and velocity data to compare between the cumulative distance stored in a RAM 104 and the distance point data previously stored in the RAM 104. Where the cumulative distance exceeds the distance point data, a lap time is calculated and displayed on a display section 106 based on the time count data sent from the time count circuit 105. Further, the CPU 100 calculates and displays on the display section 106 a time to arrive at the predetermined moving distance from the velocity data, the cumulative distance and the predetermined moving distance stored in the RAM 104.

20 Claims, 15 Drawing Sheets

FIG. 5

```
DISTANCE    15.0Km
( 03)
      0:00'00"00
```

FIG. 6

```
              15.0Km
   LAP
  ( 03) 0:25'10"68
   SPLIT
        1:16'45"78
```

FIG. 7

```
Receive        1.0 Sec
( 00)
   0:00'00"00
```

FIG. 8

```
H.R AVE 165/15.0Km
LAP
(03) 0:25'10"68
SPLIT
     1:16'45"78
```

FIG. 9

```
           15.1Km
 (03) 1:17'16"33
 GOAL
      3:34'29"07
```

FIG. 10

```
 H.R    165  /15.1Km
 (03) 1:17'16"33
 GOAL
      3:34'29"07
```

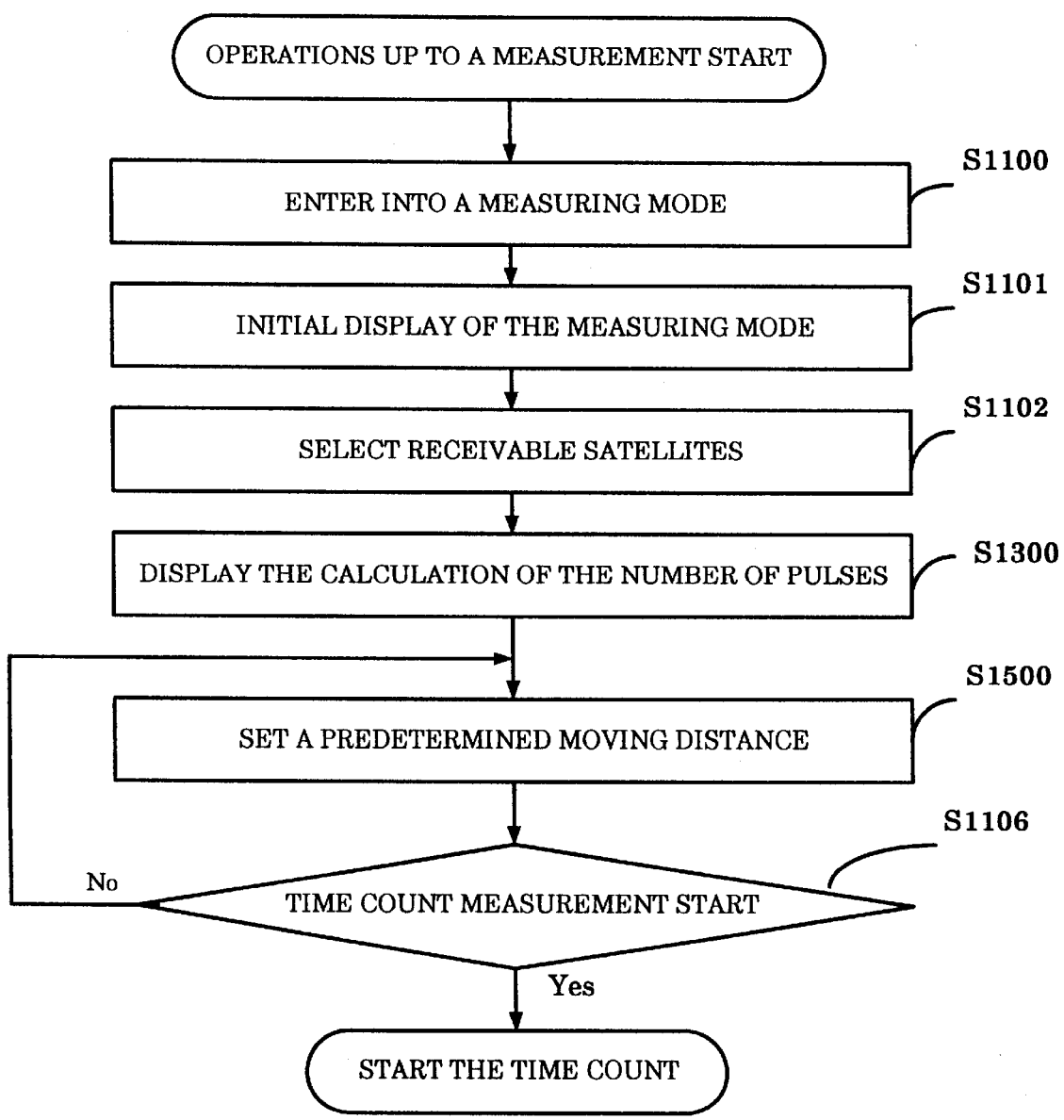

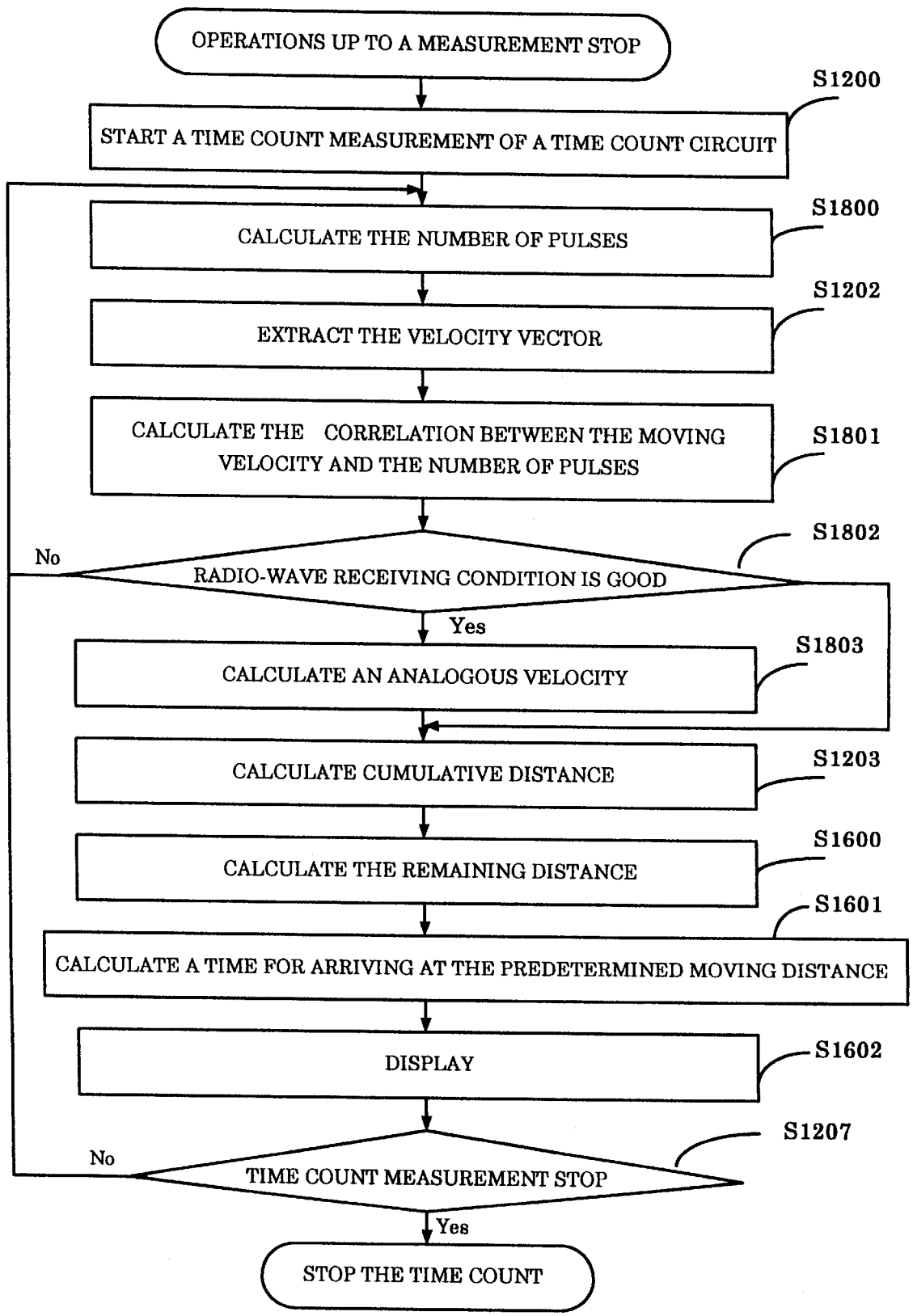

PORTABLE GPS SIGNAL RECEIVING APPARATUS

BACKGROUND OF THE INVENTION

The present invention relates generally to a GPS signal receiving apparatus that receives signals from GPS (Global Positioning System) satellites to measure the position and speed of a signal receiving apparatus and, more particularly, to a GPS signal receiving apparatus that is capable of being held by or attached to a human arm to measure the user's position during running or walking, as well as the user's moving speed and moving distance.

Conventionally, the GPS system has 24 GPS satellites revolving at a rate of 12 hours per one turn on six orbits at an inclination angle of 55 degrees at approximately 20,200 Km above the earth. The navigation data required for position location is transmitted from three to four or more satellites, and is received by a receiver located on the earth so that a moving body having the receiver mounted thereon has calculated therefor position location data such as the position of the moving body, the moving speed thereof, etc. It is also possible to determine a velocity vector of the mobile body by measuring a Doppler frequency contained in a carrier wave. The transmission wave emitted by the GPS satellite involves two types, i.e., an L1 signal having a frequency of 1.57542 GHz and an L2 signal a frequency of 1.22760 GHz. Ordinary position location utilizes only L1. L1 is subjected to PSK modulation by a pseudo noise code (a synthetic wave of a C/A code used for satellite identification and navigation data such as satellite orbit information, time information, etc.) and spread spectrum, to be transmitted from the satellite. This radio wave is received by a GPS signal receiving apparatus as shown in FIG. 3. The 1.57542-GHz signal received by an antenna 300 is amplified by an L-passband amplifying circuit 301, converted by a down-converter section 302 to a first IF (intermediate frequency) signal of several tens of MHz to 200 MHz, and is further converted to a second IF signal of approximately 2 MHz to 5 MHz. The second IF signal is supplied to a voltage comparator 303 so that it is digitally-converted by a clock signal of several times the IF signal frequency by use of a voltage comparator 303. The output of this is spread spectrum data. In a message decoding circuit 304, the digital signal output by the voltage comparator 303 is subjected to spread spectrum by a C/A code that is the same pseudo noise code as that of the satellite generated by a C/A code generator 305, thereby obtaining navigation data. This operation is performed using a plurality of satellites. A position location calculating means 306 determines position location data from the navigation data of usually four satellites. As size reduction in GPS receivers such as that described above advances, consideration has been given to utilizing the GPS device for purposes of determining human running and walking moving distance or moving speed, such as disclosed in Japanese Unexamined Patent Publication (Kokai) No. H6-118156, etc.

Meanwhile, in order to measure the time period taken by a user to complete a particular segment of a running course (hereinafter referred to as a lap time), a required step must be taken in which a user, when passing a certain point, operates a button to record the lap time. Other means have been devised for this purpose, such as a transmitter being installed at a certain point to receive a signal to automatically record a lap time. Also, during running, physiological or "organic" data, such as the number of pulses or pulse rate, the number of steps or movements, etc., in addition to time data, is an important index representing performance. These types of organic indices are generally obtained by use of a button similar to that used in recording of a lap time.

Further, there is known a device, as disclosed by Japanese Unexamined Patent Publication No. H6-082576, for example, which is adapted to anticipate a time required for a user to move an arbitrary distance (broadly referred to herein as "motion amount") at an arbitrary speed (broadly referred to herein as "motion strength"). FIG. 4 is a structural view thereof, which has a pulse measuring means 400 for measuring a number of pulses when exercise is done at various a different motion strength. Thereupon, a calculating means 402 calculates a correlation between motion strength and the number of movement pulses. Then, if motion amount data input means 401 is supplied with motion amount data (distance data) to be run, the calculating means 402 calculates an expected motion strength (speed) and a completion time of a predetermined amount of motion (distance) based on the correlation between the motion strength and the number of movement pulses, and outputs the estimated values to an output means 403.

Where the conventional portable device is used in conjunction with an exercise such as running to measure a lap time or organic information, various manual operations are required when arriving at a destination point. Also, even the receiving of a signal from a transmitter previously installed to automatically memorize a certain point cannot provide advance information as to at which point it is located. Also, such a transmitter is not necessarily installed at a desired point. In particular, in physical training, it has been considered an important performance index to assess how the time information and organic information vary with respect to a specific distance.

Meanwhile, when calculating a predetermined motion amount (distance) and expected arrival time, it has been necessary to measure movement pulse data while performing a trial run at various different speeds to determine a correlation between the speed and the number of movement pulses.

Also, when determining an expected motion strength (speed) there is a necessity of using the coefficients based on a general consideration such as wearer's age and endurance criteria so that it is difficult to reflect an individual difference or physical conditions, etc.

SUMMARY OF THE INVENTION

It is an object of the present invention, made in view of the foregoing circumstances, to provide a portable apparatus which is adapted to accurately measure a user's moving distance during walking or running to automatically display and memorize time information and organic information upon arriving at a previously set distance point, and to further display an expected time of arrival to a preset moving distance when continuously moving at a moving speed of an arbitrary time point.

BRIEF DESCRIPTION OF THE DRAWINGS

FIG. 5 is a diagram showing one example of a visual display in the first embodiment of the present invention;

FIG. 6 is a diagram showing one example of the display section;

FIG. 7 is a diagram showing one example of a visual display in the second embodiment of the present invention;

FIG. 8 is a diagram showing one example of the display section;

FIG. 9 is a diagram showing one example of a visual display in a third embodiment of the present invention;

FIG. 10 is a diagram showing one example of a visual display in a fourth embodiment of the present invention;

FIG. 17 is a diagram showing an operational flow up to a measurement start in the fourth embodiment of the present invention; and FIG. 18 is a diagram showing an operational flow from the measurement start to a stop in the same embodiment.

DETAILED DESCRIPTION OF THE PREFERRED EMBODIMENTS

Figure 1:
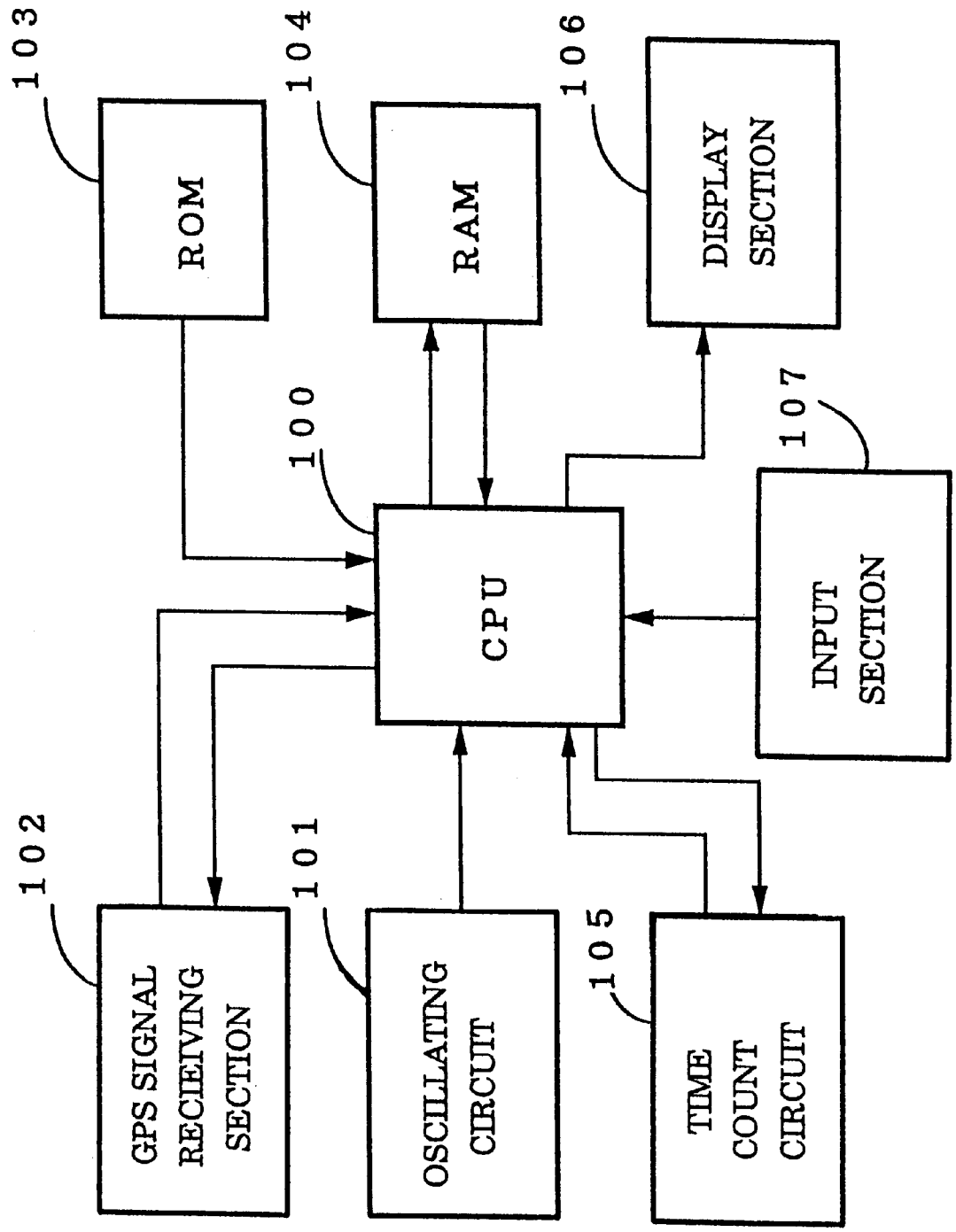
FIG. 1 is a circuit block diagram of a GPS signal receiving apparatus showing a first embodiment of the present invention.

In order to achieve the above-described object, a first aspect of the present invention is characterized by providing a GPS signal receiving apparatus for receiving signals from GPS satellites, and, more specifically, a portable GPS signal receiving apparatus comprising moving distance calculating means for calculating a moving distance of a wearer from a received location signal or speed signal, distance setting means for setting a desired moving distance point, time counting means for counting a time, time count calculating means for receiving notification of a time count start of the time count means, and for calculating a moving time from the time count start of the time count means to the set distance or a previous set distance to the set distance when it has been determined that the wearer has reached the distance set in the distance setting means, and first display means for displaying a time count time calculated by the time count calculating means.

In a second aspect of the invention, a GPS signal receiving apparatus is provided for receiving signals from GPS satellites, and is a portable GPS signal receiving apparatus comprising moving distance calculating means for calculating a moving distance of a wearer from a received location signal or speed signal, distance setting means for setting a desired moving distance point, time counting means far counting a time, physiological information measuring means for detecting and processing, by measuring, physiological information such as pulses or movements at predetermined intervals, physiological information calculating means for receiving notification of a time count start of the time count means, and for performing a calculating process on physiological information measured from the time count start of the time count means until the set distance is reached, or from a previous set distance to the set distance by the physiological information measuring means when it has been determined that the wearer has reached the distance set in the distance setting means, and second display means for displaying a result of calculation calculated by the organic information calculating means.

In a third aspect of the invention, a portable GPS signal receiving apparatus is provided of the type described above, having signal receiving interval control means for controlling the signal receiving interval of the GPS signal receiving apparatus corresponding to the distance set in the distance setting means.

A fourth aspect of the invention is characterized by providing a portable GPS signal receiving apparatus of the type described above, wherein the signal receiving interval control means makes the signal receiving interval of the GPS signal receiving apparatus shorter immediately before the wearer reaches the distance set in the distance setting means.

A fifth aspect of the invention is characterized by providing a portable GPS signal receiving apparatus of the type described above, having signal receiving interval setting means for setting the signal receiving interval of the GPS signal receiving apparatus at a desired interval, and a signal receiving interval control means provided for controlling the signal receiving interval of the GPS signal receiving apparatus at the interval set in the signal receiving interval setting means.

A sixth aspect of the invention is characterized by providing a portable GPS signal receiving apparatus of the type described above, having notifying means for notifying that the calculating result has been displayed by providing an alarm or vibration when displaying the result on the first display means or the second display means.

A seventh aspect of the invention is characterized by providing a portable GPS signal receiving apparatus of the type described above, further comprising predetermined moving distance arriving time calculating means for calculating a time required to arrive at the predetermined moving distance based on the distance set in the distance setting means, the moving distance determined by the moving distance calculating means and the moving speed obtained by the GPS signal receiving apparatus.

An eighth aspect of the invention is characterized by providing a portable GPS signal receiving apparatus of the type described above, wherein correlation calculating means is further provided for determining a correlation between the moving speed and the physiological information from the physiological information calculated by the physiological information calculating means and the moving speed obtained by the GPS signal receiving apparatus, and a pseudo speed calculating means for calculating a moving speed from the physiological information calculated by the physiological information calculating means and the correlation between the physiological information and the moving speed determined by the correlation calculating means.

Explanations will be made hereinbelow of various preferred embodiments of the present invention.

1. Structure of First Embodiment

First, a description will be provided of the structure of a first embodiment of the present invention in which a portable-type GPS signal receiving apparatus is adapted to measure a Doppler frequency of a carrier wave, determine a cumulative moving distance based upon a velocity vector of a moving body, and automatically display a lap time when a user is arriving at a desired moving distance.

Figure 3:
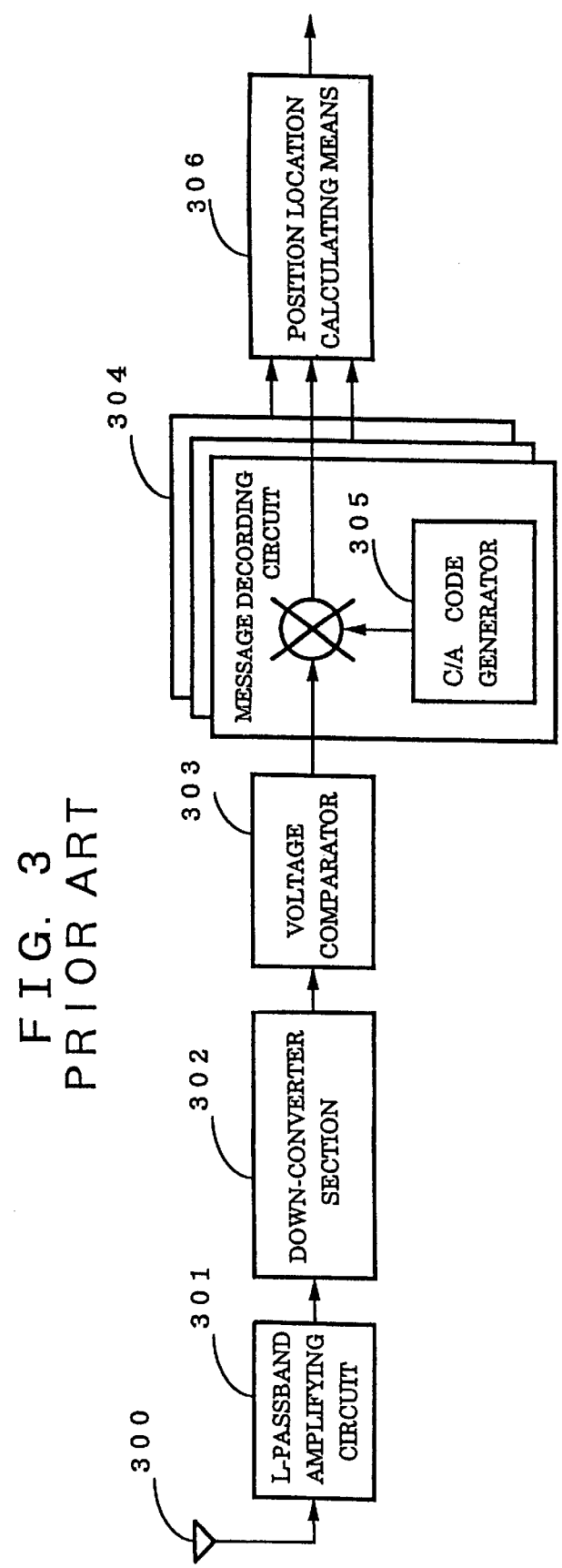
FIG. 3 is a circuit block diagram showing a structure of a conventional GPS signal receiving apparatus.
Figure 4:
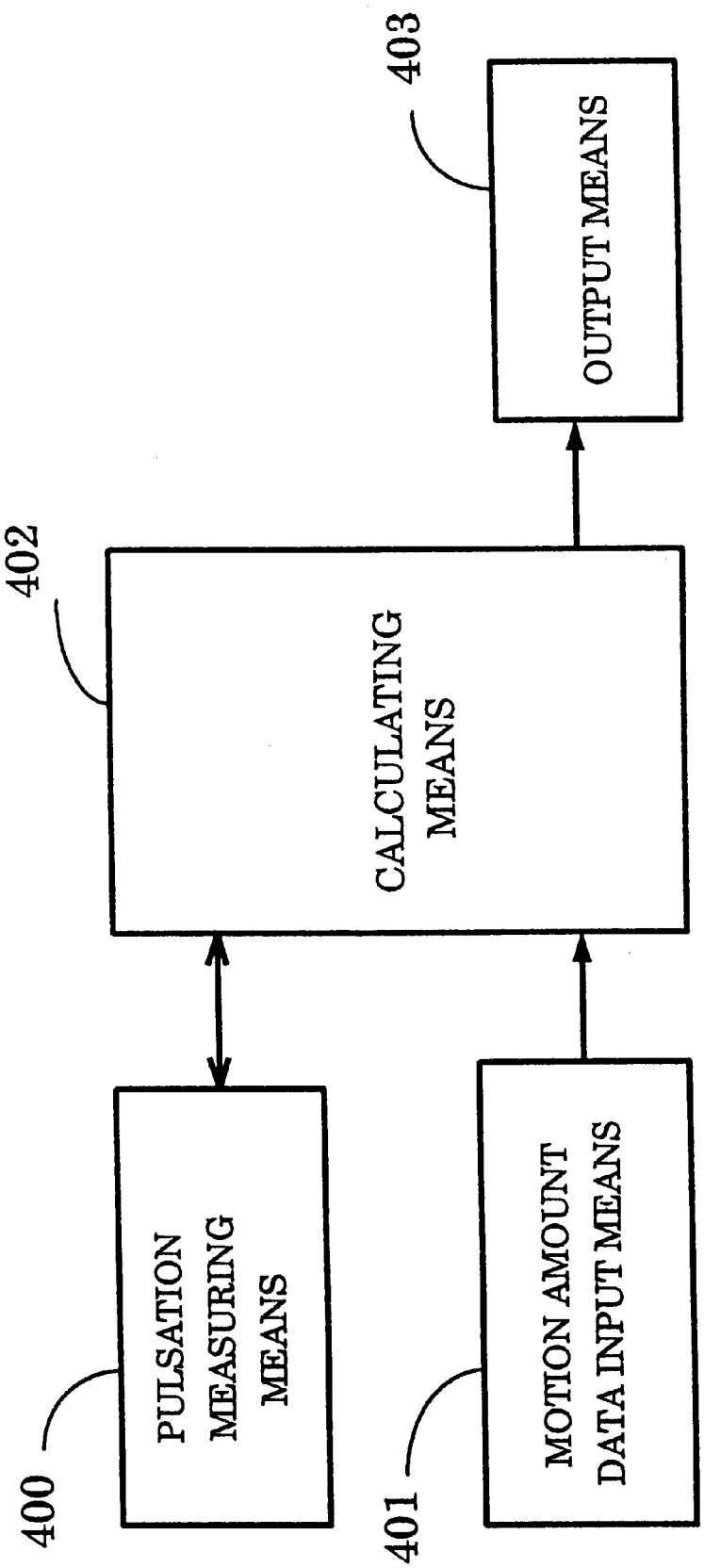
FIG. 4 is a circuit block diagram showing a structure of a conventional time calculating device.

In FIG. 1, a CPU 100 controls each of the illustrated sections and transfers data by using, as an operating clock, a signal output by an oscillating circuit 101 and further according to a control program stored by a ROM 103. Meanwhile, a RAM 104 temporarily stores time count data or the various data generated during execution of the control program by the CPU 100. A GPS signal receiving section 102 is a GPS signal receiving means that is controlled at an operation interval by the CPU 100, and which possesses structure for performing functions ranging from an antenna 300 to a position location calculating means 306, as shown in FIG. 3, so as to output three-dimensional velocity vectors to the CPU 100.

A time count circuit 105 is started and stopped in time measurement by instruction of the CPU 100 so that, if started, it outputs an interrupt signal at a period, for example, of 10 Hz to the CPU 100. An input section 107 comprises a button switch, and outputs an input interrupt signal to the CPU 100 where there is a button switch input. A display section 106 is a display panel such as a liquid crystal display to display a running time counted by time count circuit 105 or a calculated total distance.

Operation of First Embodiment

An explanation will now be made of the operation of a portable GPS signal receiving apparatus according to the present embodiment.

The present apparatus is preferably embodied as a watch type device in terms of portability and wearability and can perform various functions such as the display of current time, which functions have no bearing on the present invention and their explanations are omitted.

A. Operations Up to Time Count Start

Figure 11:
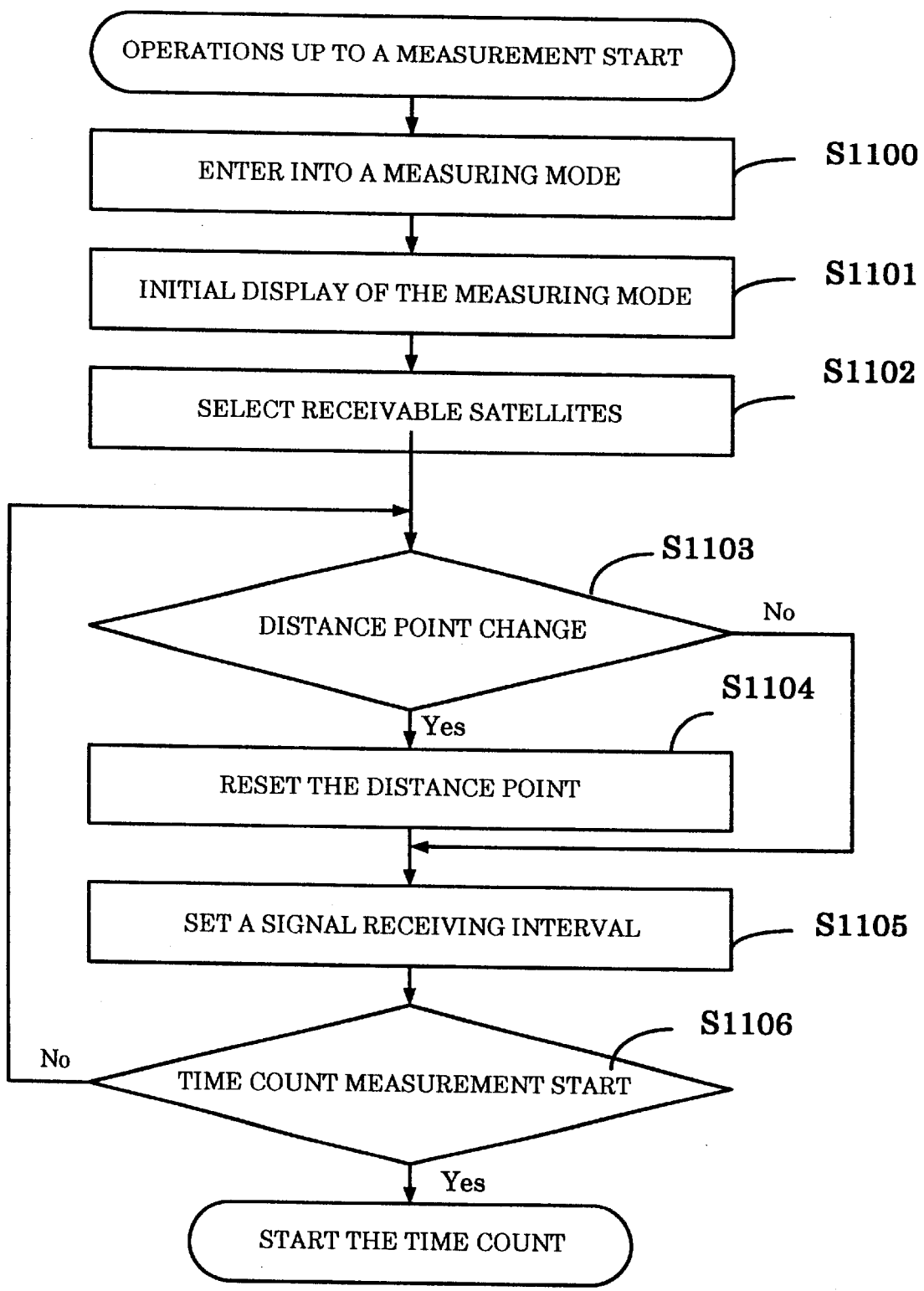
FIG. 11 is a diagram showing an operational flow up to a measurement start in the first embodiment of the present invention.

An explanation will now be made of the operations up to a time count start based on FIG. 11.

If a wearer operates a button switch on the device to instruct the device to enter into a running time measuring mode, the input section 107, on which the button operation is effected, notifies the CPU 100 (S1100). The CPU 100 generates a confirmatory initial display indicating that it has entered into this mode on the display portion 106, and simultaneously requests the GPS signal receiving section 102 to receive a GPS signal (S1101). The GPS signal receiving section 102, particularly at an early stage, selects 3–4 receivable satellites among the 24 GPS satellites. At this time, a display indicating that satellites have been selected may be provided by the display section 106 (S1102). Then, the wearer inputs a desired moving distance point (i.e., the distance to a desired destination or a lap distance) by operating the button switch. Preferably, if it is the same point previously set, resetting of the desired distance is not required (S1103). The input section 107 notifies the CPU 100 of entry into a distance inputting mode. The CPU 100 displays the content of the distance inputting mode on the display section 106. The wearer sets a desired distance point by switch operation (S1104). The CPU 100 sends and stores the set distance point data to the RAM 104. FIG. 5 shows an example of a display in the distance inputting mode on the display section 106. FIG. 5 shows that the 3rd of the set distance points is 15 Km.

Next, the CPU 100 sets a signal receiving interval of the GPS signal receiving section 102 based on the data stored in the RAM 104 (S1105). The signal receiving interval, if made short, can accommodate abrupt speed changes during running to lessen a cumulative distance error. On the other hand, consumption power of the device increases. Accordingly, setting is made such that, where the final distance data stored in the RAM 104 is, for example, 10 Km or less, the signal receiving interval of the GPS signal receiving section 102 is set at 0.5 seconds. Whereas, when the final distance data is from 10 Km to 20 Km, the signal receiving interval is set at 1.0 second. Where the final distance data is greater, the signal receiving interval is set at 2 seconds. By automatically switching the signal receiving interval depending upon the running distance, it is possible to reduce power consumption while securing calculation accuracy for cumulative distance. Also, the signal receiving interval of the GPS signal receiving section 102 may be automatically shortened immediately before arriving at a target distance. By doing so, the determination on arriving distance becomes more accurate.

In this manner, the operations of S1103 to S1105 are repeated (S1106) until an instruction for starting a time count measurement is received (S1106).

B. Operations After Time Count Start is Initiated Up to Time Count End

Figure 12:
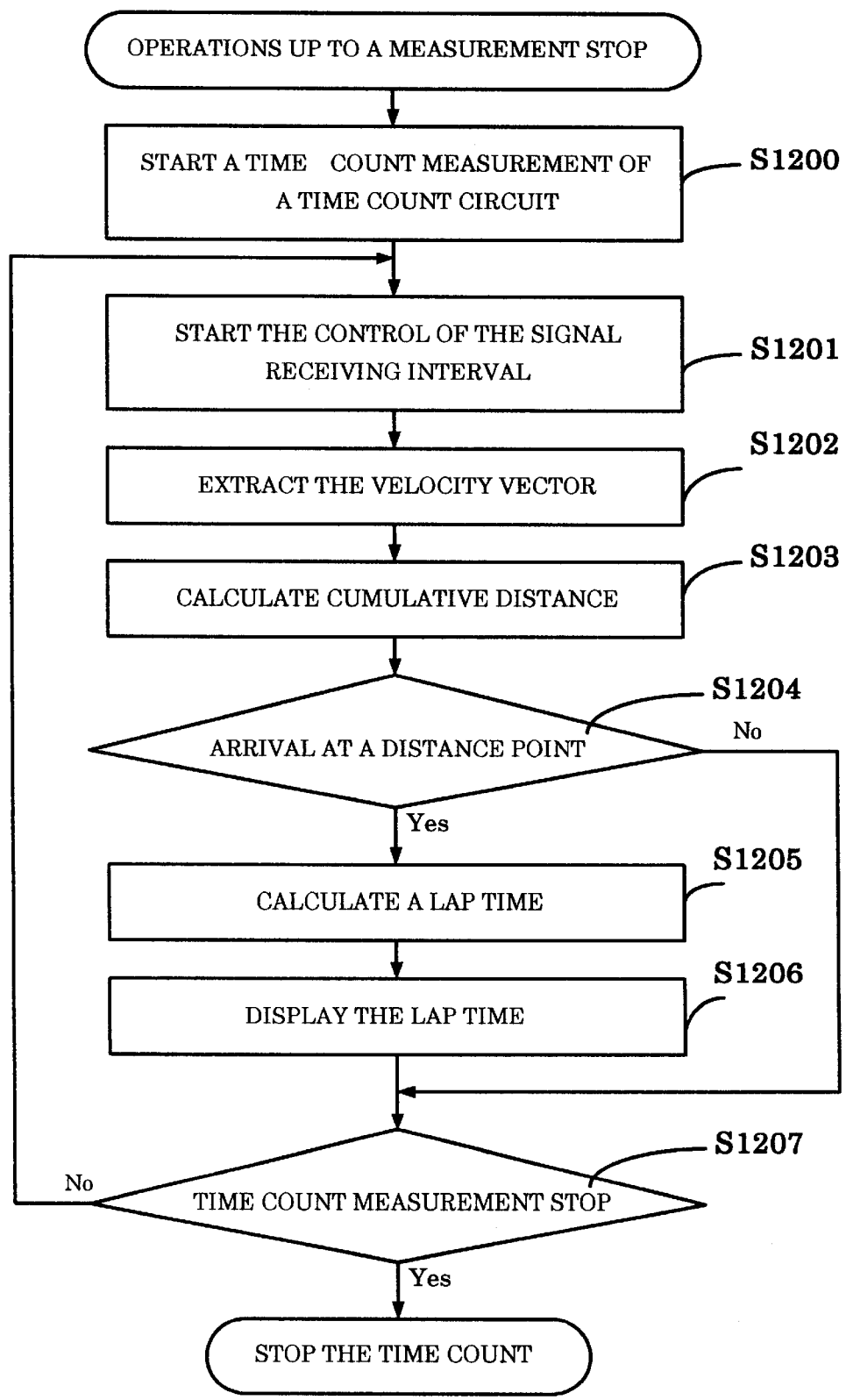
FIG. 12 is a diagram showing an operational flow from the measurement start to a stop in the same embodiment.

Next, operation of the device after a time count start is initiated until a time count end will be explained based on FIG. 12.

Thereafter, if the wearer operates the button switch to instruct the device to begin a time count, the CPU 100 instructs the time count circuit 105 to start a time count operation (S1200). Also, the signal receiving control of the GPS signal receiving apparatus 102 is performed based on the signal receiving interval data stored in the RAM 104 (S1201). The GPS signal receiving section 102 measures a Doppler frequency to output a three-dimensional velocity vector of the wearer to the CPU 100. The CPU 100 corrects in elevation angle the received velocity vector to calculate therewith velocity data in the advancing direction, for storage in the RAM 104 (S1202). At this time, the CPU 100 calculates a moving distance by using the signal receiving interval and the velocity data, for storage as cumulative distance data in the RAM 104 (S1203). These operations are repeated for each signal receiving operation. Where an error at a current time interval is encountered for some reason, the velocity data at the preceding time interval may be stored as a calculation result for the current time interval in the RAM 104.

At this time, the velocity data of the calculation result may be displayed on the display section 106. The wearer can thus know his or her current running pace by viewing the velocity data on the display section 106.

Thereafter, the CPU 100 compares the cumulative distance stored in the RAM 104 with the distance point data previously stored in the RAM 104 in a similar manner (S1204). If the cumulative distance exceeds the distance point data, a lap time is calculated based on the time count data set from the time count circuit 105, which is a movement time from the time count start to this set distance point, or from a previous set distance point to the current set distance point (S1205). The calculated lap time is displayed, together with the set distance point, on the display section 106. The lap time displayed on the display section 106 is preferably held, for example, for 10 seconds. This enables the wearer to readily confirm the lap time (S1206).

FIG. 6 shows an example of display when the wearer has arrived at the set distance point. FIG. 6 shows a set distance point at a 15-Km point, a lap time for this section of 25 minutes, 10 seconds and 68 hundredths of a second, and an integrated time from the time count start of 1 hour, 16 minutes, 45 seconds and 78 hundredths of a second.

The data displayed on the display section 106 is stored as lap time data in the RAM 104 by instruction of the CPU 104. The lap time data can be thereafter confirmed by reading out the stored content by button operation.

The operations of steps S1201–S1206 are repeated until the wearer instructs the device to stop the time count measurement by re-operating the button (S1207). If there is an instruction to stop the time count measurement, the CPU 100 determines the lapse of time from the time count start to the time count stop from the time count circuit 105, for storage in the RAM 104 and display on the display section 106.

C. Reading After Measurement

When arriving at a previously set distance point during time count measurement in the foregoing manner, the display of a lap time is automatically provided on the display section 106. In this embodiment, the stored lap time data stored can be called up even after measurement.

If the wearer instructs the device to execute the function of calling up lap time data stored in the RAM 104, the input section 107 notifies the CPU 100 of such operation.

Receiving this notification, the CPU 100 reads a lap time corresponding to the distance point out of the RAM 104 for display on the display section 106. This enables the wearer to confirm the lap time for each set distance point.

2. Structure of Second Embodiment

The above-described first embodiment was adapted to measure a Doppler frequency of a carrier wave, determine a cumulative moving distance based on velocity vectors of a moving body obtained by a GPS receiver, and automatically displaying a lap time when arriving at a predetermined moving distance. The second embodiment is adapted to automatically calculate and display physiological (or organic) information such as pulse and pitch when a desired distance is reached in a similar manner. In particular, the physiological information during running serves as an index of physiological exercise strength, which may be useful information for training.

The structure of the second embodiment will be described based on FIG. 2. Incidentally, a description of parts which are structurally similar or the same as those of the first embodiment is omitted, with only the differences being explained.

Figure 2:
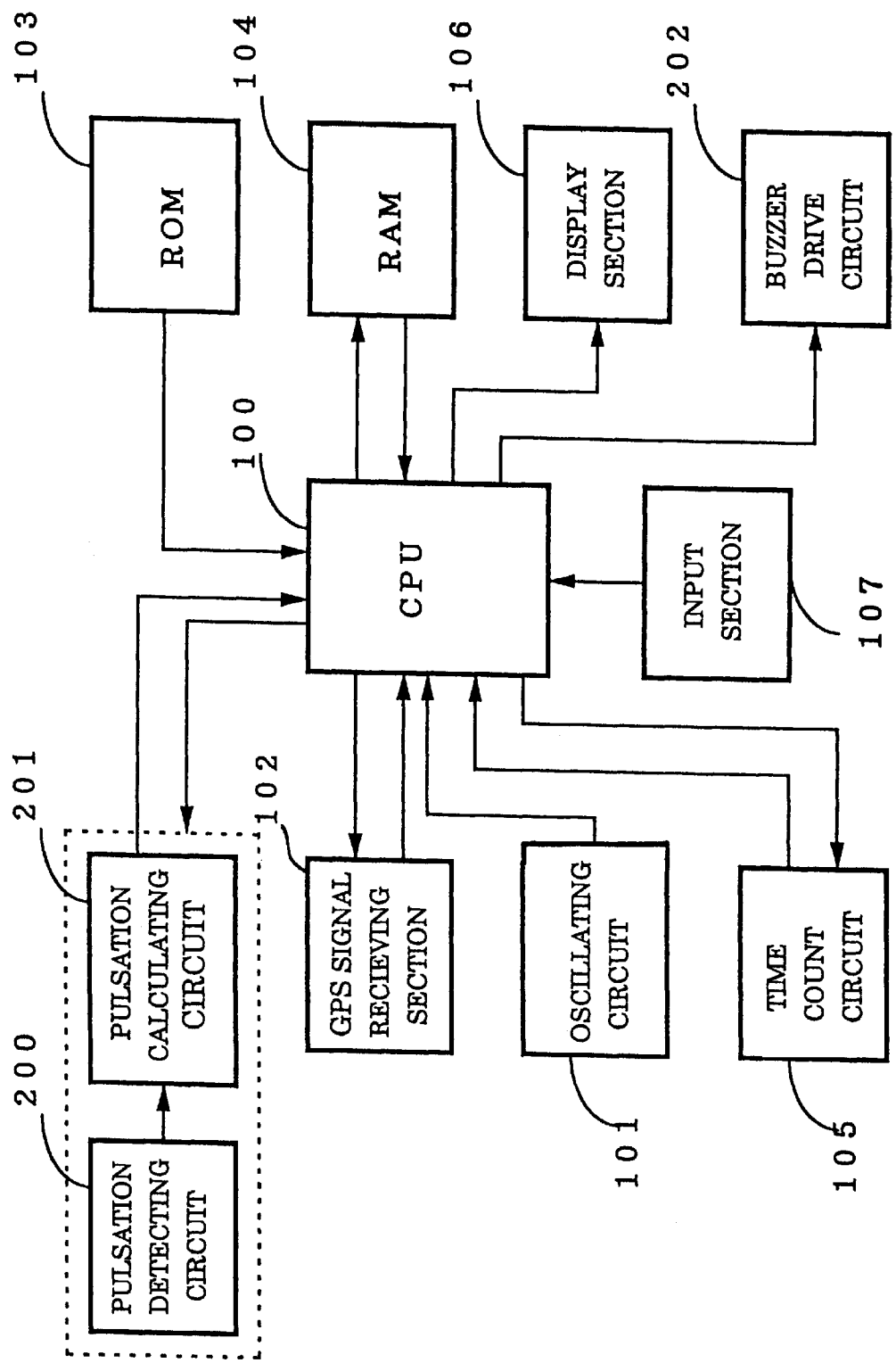
FIG. 2 is a circuit block diagram of a GPS signal receiving apparatus showing a second embodiment of the present invention.

In FIG. 2, a pulse detecting circuit 200 and a pulse calculating circuit 201 are started and stopped in operation by instruction of the CPU 100. The pulse detecting circuit 200 incorporates an optical pulse-wave sensor formed by a light emitting portion and a light receiving portion, which detects a pulse and amplifies the detected signal, for output to the pulse calculating circuit 201. The pulse calculating circuit 201 includes A/D conversion means and A/D converts and frequency analyzes the pulse-wave signal, and outputs the frequency-analyzed result thereof to the CPU 100. The CPU 100 calculates the number of pulses per minute based on the output result, for storage in the RAM 104. A buzzer drive circuit 202 outputs, by instruction of the CPU 100, a buzzer drive signal for a given time period to a piezoelectric device or the like.

Incidentally, it is possible to employ, in place of the pulse detecting circuit 200 and the pulse calculating circuit 201, a heart-rate detecting circuit and a heart-rate calculating circuit for determining a heart rate from a cardiac potential, or a pitch detecting circuit and a pitch calculating circuit for determining a running pitch.

Operation of Second Embodiment

The operation of determining a cumulative moving distance of the wearer from the velocity vector output by the GPS signal receiving section 102 is the same as the first embodiment. In particular, an explanation will be provided of the operations of the pulse detecting circuit 200 and the pulse calculating circuit 201, as well as a pulse data calculating process.

A. Operations Up to Time Count Start

Figure 13:
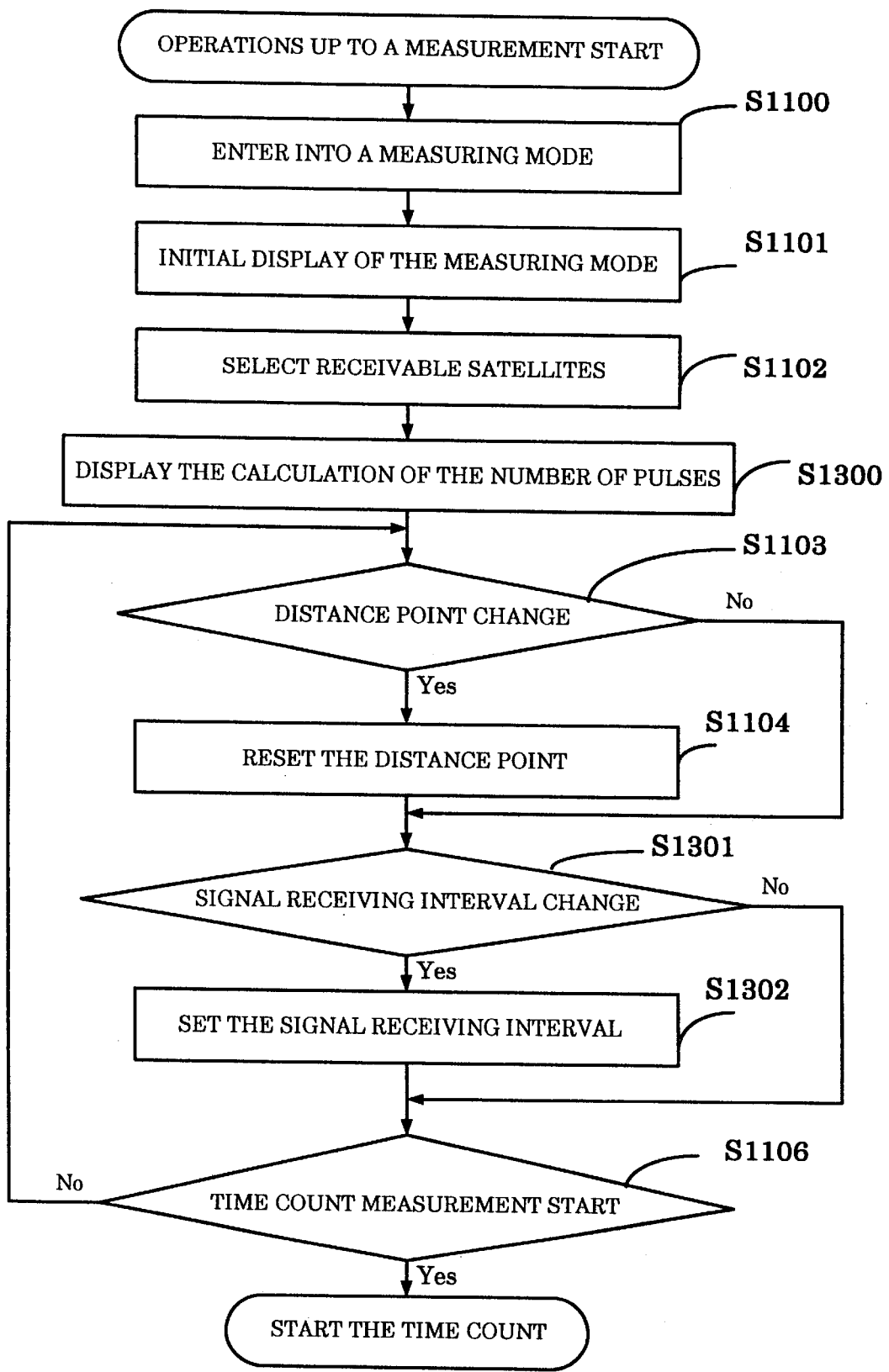
FIG. 13 is a diagram showing an operational flow up to a measurement start in the second embodiment of the present invention.

First, an explanation will be provided of the operations up to an instruction for a time count start based on FIG. 13.

When the wearer operates the button switch to instruct the device to enter an organic information measuring mode, the input section 107 thus operated notifies the CPU 100.

The CPU 100 generates an initial display of this mode to select receivable satellites (S1100–S1102).

Also, the CPU 100 requests to start operating the pulse detecting circuit 200 and the pulse calculating circuit 201. In the pulse detecting circuit 200 in particular, adjustment in amplification factor is required due to differences in operating environments and a predetermined time is required for stabilizing a pulse output signal. The wearer can be advised by providing a display on the display section 107, that a stabilized detecting rate has been secured. The pulse calculating circuit 201 A/D-converts the pulse-wave signal output from the pulse detecting circuit 200 at 8-Hz intervals and performs a frequency analysis calculation when 128 points of converted data have been gathered, outputting the result to the CPU 100. The CPU 100 extracts a maximum spectrum among, for example, the calculation results to convert it into the number of pulses per minute, displaying it on the display section 107. The data in the number of 128 to be frequency-analyzed are shifted in units of 32 (8 Hz * 4 seconds) to a calculation object, thereby renewing the display every 4 seconds on the display section 107. By this operation, the wearer can make sure of the number of pulses prior to starting time count measurement (S1300).

The method of setting a desired distance point is similar to the first embodiment, the description thereof being omitted (S1103, S1104).

In the first embodiment, the GPS signal receiving section 102 automatically determined the signal receiving interval based on the distance data stored in the RAM 104. In this embodiment of the present invention, another method is used to allow setting by the wearer. The wearer inputs the setting of the signal receiving interval by operating the button switch. However, where it is the same as the preceding setting, resetting is not required (S1301). The input section 107 notifies the CPU 100 of entry into a signal receiving setting mode. The CPU 100 displays the signal receiving setting mode on the display section 106. The wearer sets a desired signal receiving interval by button switch operation. The CPU 100 sends a set signal receiving interval to the RAM 104 for storage (S1302). FIG. 7 shows an example of display of the signal receiving set mode on the display section 106. In FIG. 7, a signal receiving interval set at 1.0 second is shown.

In this manner, the operations of steps S1103–S1302 are repeated until a time count measuring start is started (S1106).

B. Operations After a Time Count Start to a Measurement End

Figure 14:
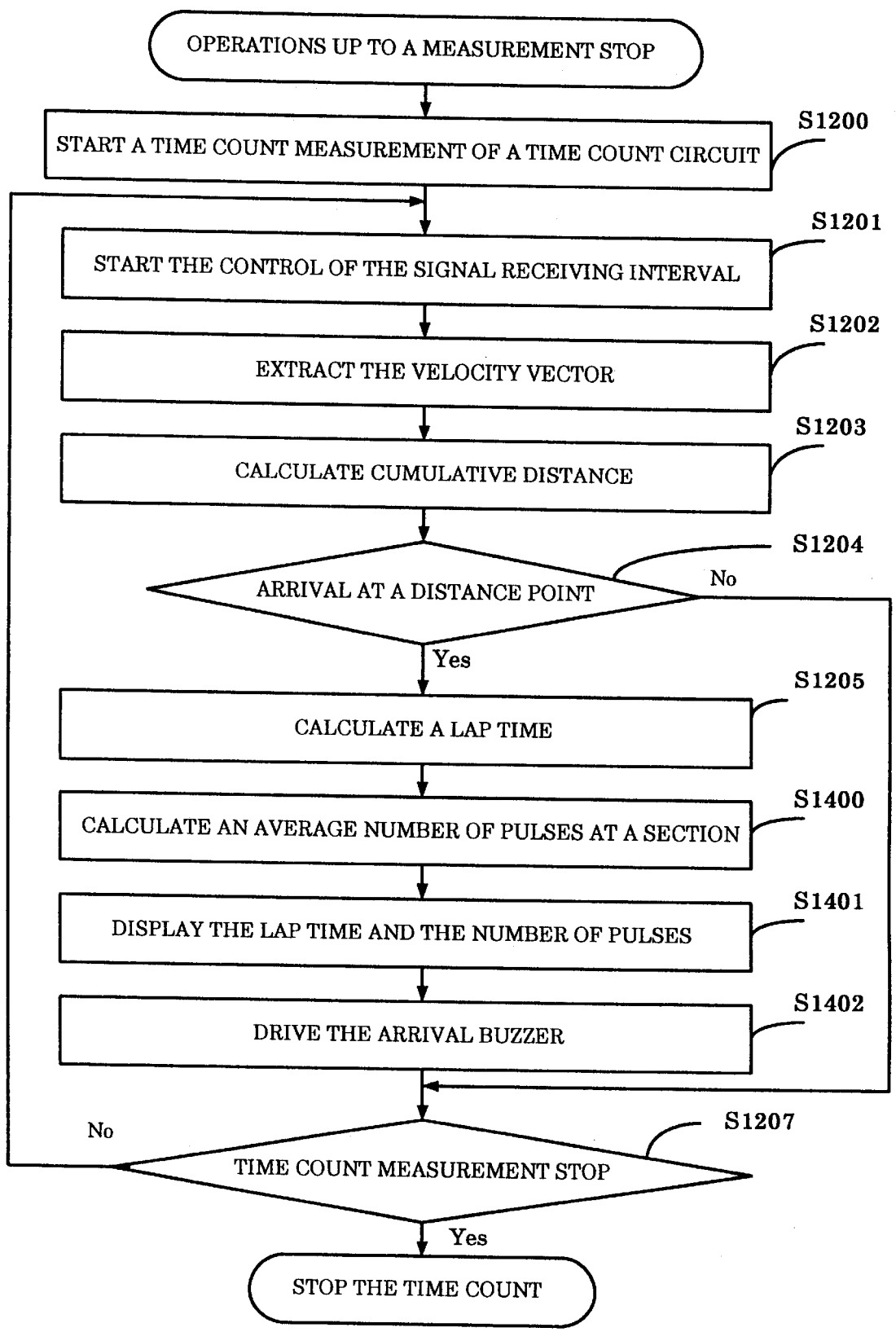
FIG. 14 is a diagram showing an operational flow from the measurement start to a stop in the same embodiment.

Now, an explanation will be provided of the operations from a time count start instruction to a measurement end based on FIG. 14.

Thereafter, when the wearer instructs the device to begin a time count by operating the button switch, the CPU 100 instructs the time count circuit 105 to start a time count operation (S1200). The GPS signal receiving apparatus 102 calculates a moving distance by the signal receiving interval and the velocity data similarly to the first embodiment, and stores it as cumulative distance data in the RAM 104 (S1201–S1203).

Also at this time, the CPU 100 calculates the number of pulses based on a frequency analysis result output every 4 seconds from the pulse calculating circuit 201, for storage in the RAM 104. The pulse number data stored in the RAM 104 is to be utilized as data after the time count start.

Thereafter, where the cumulative distance data exceeds the distance point data, a lap time measurement is done and calculation is made for the average number of pulses from the time count start to the currently set distance point or from the formerly set distance point to the currently set distance point, based on the pulse data stored in the RAM 104 (S1205, S1400). The calculated number of pulses is displayed, simultaneously with a lap time, on the display section 106 (S1401). Although the average value calculation for the number of pulses was made at a section considered, the data of the cumulative distance data immediately before exceeding the distance set point data may be displayed on the display section 106. This is because instantaneous value data like this is more important than the average value data when doing interval training.

The CPU 100 instructs the buzzer drive circuit 202 to output a buzzer signal for a given time period (S1402). This enables the wearer to be advised by a buzzer that his own set distant point is reached. There is no limitation to a buzzer sound, but may be the vibration of the main body.

FIG. 8 shows an example of display when the wearer is arriving at the set distance point. In FIG. 8 are shown a set distance point at a 15-Km point, a lap time for this section of 25 minutes, 10 seconds and 68 hundredths of a second, a cumulative time from the time count start of 1 hour, 16 minutes, 45 seconds, 78 hundredths of a second, and an average number of pulses for this section of 165.

The data displayed on the display section 106 is stored in the RAM 104 such that the lap time data and the pulse number data correspond to each other. Thereafter, the lap time data and the number of pulses at that time can be confirmed by reading out the content stored due to button operation.

In this manner, the operations of steps S1201–S1202 are repeated until the wearer operates the button switch to instruct the device to stop the time count measurement (S1207). When an instruction for stopping the time count measurement comes, the CPU 100 determines a lapse of time from the time measurement start to the time count stop and stores it in the RAM 104, for display on the display section 106.

3. Structure of Third Embodiment

The above-described first embodiment was adapted to measure a Doppler frequency for a carrier wave, determine a cumulative moving distance from a velocity vector of a moving body, and automatically calculate and display a lap time where arriving at a desired moving distance. The third embodiment is adapted to determine and display a time it takes to arrive at a predetermined distance (goal).

The structure of the third embodiment is based on FIG. 1, and is the same structure as in the first embodiment.

Operation of Third Embodiment

An explanation will be provided of the operation of a portable GPS signal receiving apparatus according to this embodiment.

A. Operations Up to Time Count Start

Figure 15:
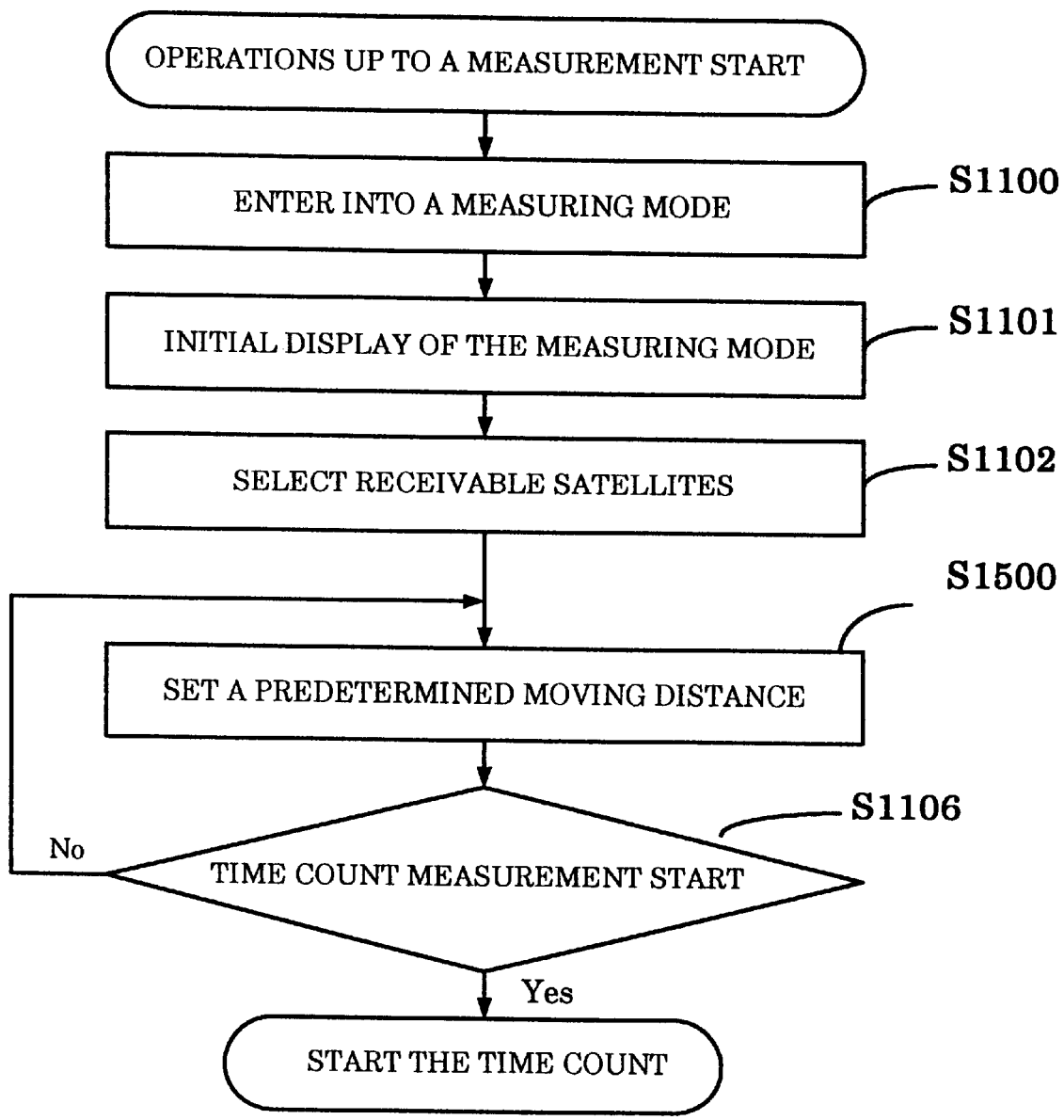
FIG. 15 is a diagram showing an operational flow up to a measurement start in the third embodiment of the present invention.

First explained are operations up to receipt of an instruction for entering a time count mode, based on FIG. 15.

When the wearer operates the button switch to instruct the device to enter into a measuring mode, the input section 107 in which the operation is input notifies the CPU 100 thereof. The CPU 100 generates an initial display of this mode, and selects receivable satellites (S1100–S1102).

Then, the wearer inputs a desired predetermined moving distance by operating the button switch (S1500). The CPU 100 sends the set predetermined moving distance to the RAM 104, for storage therein. When the predetermined moving distance is set, the preparation for a time count start is complete (S1106).

B. Operations From After Time Count Start to Measurement End

Figure 16:
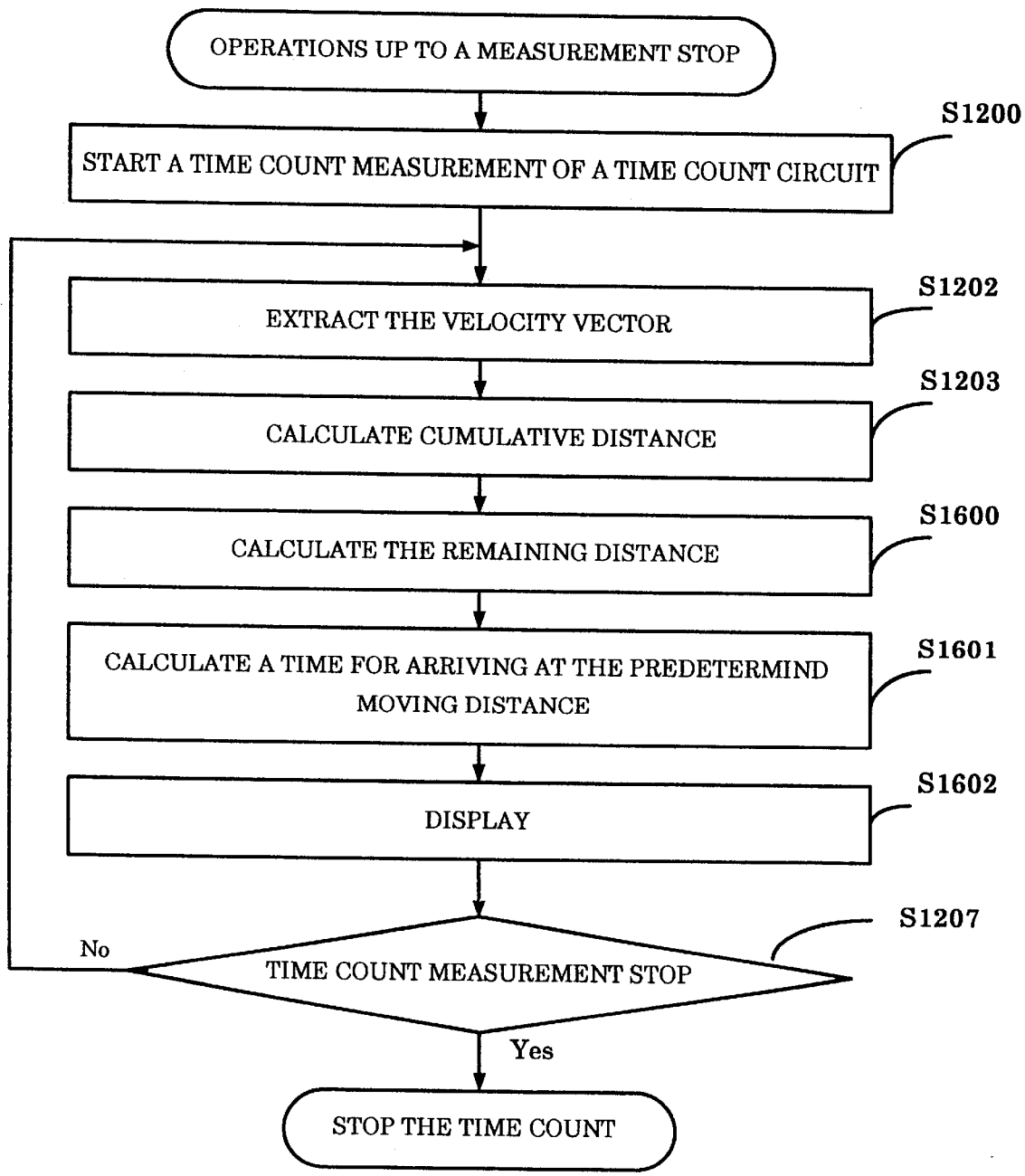
FIG. 16 is a diagram showing an operational flow from the measurement start to a stop in the same embodiment.

Now, an explanation will be provided of operation of the device from after an instruction to begin a time count start is received to a measurement end, based on FIG. 16.

When the wearer operates the button switch to instruct the device to begin a time count, the CPU instructs the time count circuit 105 to start a time count operation (S1200). The GPS signal receiving section 102 measures a Doppler frequency of a carrier wave to output a three-dimensional velocity vector to the CPU 100. The CPU 100 corrects in elevation angle the received velocity vector to calculate velocity data in an advancing direction, and sores it in the RAM 104 (S1202). At this time, the CPU 100 calculates a moving distance from a signal receiving interval and the velocity data and store it as cumulative data in the RAM 104 (S1203). Then a difference between the predetermined moving distance stored in the RAM 104 and the cumulative data is obtained to calculate the remaining moving distance (S1600). Further, a time for arriving at the predetermined moving distance is calculated from the current velocity data and the remaining moving distance (S1601).

The calculated arriving time to the predetermined moving distance is di splayed, together with a cumulative distance, a measured time and so on, on the display section 106 (S1602).

FIG. 9 shows a display example. In FIG. 9, showing is that the cumulative distance is 15.1 Km, the integral time from the time count start is 1 hour 17 minutes 16 seconds 33, and the predetermined moving distance arriving time is 3 hours 34 minutes 29 seconds 07. Assumption is made that the predetermined moving distance, though not shown on the display, has been set at 42.195 km.

In this manner, the operations of S1202–S1602 a re repeated until the wearer re-operates the button switch to instruct to stop the time count measurement (S1207). When an instruction to stop the time count measurement comes, the CPU 100 determines a lapse of time from the time count start to the measurement stop by the time count circuit 105, for storage in the RAM 104 and display on the display section 106.

7: Structure of Fourth Embodiment

The above-stated third embodiment was adapted to measure a Doppler frequency of the carrier wave, determine a cumulative moving distance from the moving body velocity vector, and determine a time to arrive at the predetermined moving distance (goal), for display. However, this fourth embodiment is adapted to automatically determine a correlation between the organic information, such as pulsation and pitches, and the moving velocity so that the moving velocity is analogously calculated from the organic information and determine the so-far cumulative moving distance and the time to arriving at the predetermined moving distance (goal), for storage, when a GPS radio wave cannot be fully received.

The structure of the fourth embodiment is based on FIG. 2 and the same in structure in structure as the second embodiment.

8: Operation of Fourth Embodiment

The operation of determining a wearer's cumulative moving distance from a velocity vector output by the GPS signal receiving section 102 is the same as the first embodiment, while the operations of the pulsation detecting circuit 200 and the pulsation calculating circuit 201 as well as the calculating process on the pulsation data are the same as the second embodiment. Here, explanations will be made on the operations of determining the correlation between the moving velocity and the number of pulses of the wearer to analogously determine a moving velocity from the correlation and the number of pulses.

8-1: Up to Instructing a Time Count Start

First explanations will be made on the operation up to an instruction to start a time count based on FIG. 17.

When the wearer operates the button switch to instruct to enter into the measuring mode, the input section 107 inputted by the same operation notifies the same content to the CPU 100. The CPU 100 makes initial display for this mode and selects receivable satellites (S1100–S1102).

Also, the CPU 100 request to start operating the pulsation detecting circuit 200 and the pulsation calculating circuit 201. The pulsation detecting circuit 200 and the pulsation calculating circuit 201, in particular, require adjustment in amplification factor depending on the difference in operational environment, requiring a predetermined time period for stabilizing pulsation output signals. The calculating circuit of the pulse calculating circuit 201 is outputted to the CPU 100.

When the CPU 100 calculates the number of pulses per one minute, it is displayed on the display section 107 (S1300).

Then the wearer operates the button switch to input a desired predetermined moving distance (S1500). The CPU 100 sends the set predetermined moving distance to the RAM 104 to store it. When the predetermined moving distance has been set, the preparation for starting the time count start completes (S1106).

8-2: From After Instructing a Time Count Start to Instructing a Measurement End Then explanations will be made on the operations from after instructing a time count start to a measurement end based on FIG. 18.

We the wearer operates the button switch to instruct to start time counting, the CPU 100 instructs the time count circuit 105 to start a time count operation (S1200) If the time count operation is started, the number of pulses is calculated by the pulsation detecting circuit 200, the pulsation calculating circuit 201 and the CPU 100, for storage in the RAM 104 (S1800). The GPS signal receiving section 102 measures a Doppler frequency of the carrier wave to output a wearer's three-dimensional velocity vector to the CPU 100. The CPU 100 corrects in elevation angle the sent velocity vector to calculate as velocity data in an advancing direction, for storage in the RAM 104 (51202). Then the CPU 100 calculates the correlation between the moving velocity and the number of pulses by using the pulsation data stored in the RAM 104 and the velocity data (51801). The determination of the correlation may be by using a method of least squares. However, such data are not taken into consideration as those of worse radio-wave receiving conditions in the GPS signal receiving section 102, or extremely great or small data. If the radio-wave receiving condition in the GPS signal receiving section 102 is determined good, the CPU 100 calculates a moving distance from the signal receiving interval and the velocity data to store as cumulative distance data in the RAM 104 (51203). Conversely, if the radio-wave receiving condition is poor, a moving distance is analogously determined from the correlation previously determined and the current number of pulses to calculate a moving distance, for storage as cumulative distance data in the RAM 104 (S1803, S1203).

Then a difference between the predetermined moving distance and the cumulative distance data stored in the RAM 104 is obtained to calculate the remaining moving distance (S1600). Further, a time to arrive at the predetermined moving distance is calculated from the current velocity data and the remaining moving distance (S1601).

The calculated predetermined moving distance arriving time is displayed, together with the cumulative distance and the measuring time, on the display section 106 (S1602).

FIG. 10 shows a display example. In FIG. 10, showing is that the cumulative distance is 15.1 Km, the wearer's number of pulses is 165, the integral time from the time count start is 1 hour 17 minutes 16 seconds 33, and the predetermined moving distance arriving time is 3 hours 34 minutes 29 seconds 07. Assumption is made that the predetermined moving distance, though not shown on the display, has been set at 42.195 Km.

In this manner, the operations of S1800–S1602 are repeated until the wearer re-operates the button switch to instruct to stop the time count measurement (S1207). When an instruction to stop the time count measurement comes, the CPU 100 determines a lapse of time from the time count start to the measurement stop by the time count circuit 105, for storage in the RAM 104 and display on the display section 106.

As explained as above, the present invention provides the effects as given below.

A desired moving distance point can be set. Since a lap time upon passing through the point and organic V information are automatically stored, button operations are unnecessary. Also, there is no possibility of a failure to depress and a erroneous operation (claims 1, 2). The notification by buzzer or vibration eliminates overlooking information (claim 6). Power consumption is reduced by controlling the signal receiving interval of the GPS signal receiving apparatus corresponding to the set distance (claim 3). Also, errors in calculating the cumulative moving distance is lessened (claims 4, 5).

A predetermined moving distance arriving time can be obtained by being modified in real time during moving without necessitating previous preparatory measurements (claims 7, 8). Also, even when the gps signal is under poor receiving conditions,-a predetermined moving distance arriving time can be obtained by analogically determining a moving speed (claim 8).

What is claimed is:

1. A portable GPS signal receiving apparatus for receiving signals from GPS satellites comprising:

a portable GPS receiver for receiving GPS location signals and determining therefrom at least one of a location and a speed of a user of the receiver;

moving distance calculating means for calculating a distance moved by a user of the apparatus in accordance with one of a received GPS location signal and a speed signal derived from the received GPS location signal;

distance setting means for allowing the user to set a desired distance to be moved by the user;

time counting means for counting time in response to a time count start instruction;

time count calculating means for calculating an elapsed time from receipt of the time count start instruction supplied to the time count means, to a completion time when the user has moved the distance set in the distance setting means; and first display means for displaying the time calculated by the time count calculating means.

2. A portable GPS signal receiving apparatus according to claim 1; further comprising signal receiving interval control means for controlling a signal receiving interval at which the GPS receiver periodically receives GPS signals in accordance with the distance set in the distance setting means.

3. A portable GPS signal receiving apparatus according to claim 2; wherein the signal receiving interval control means includes means for reducing the signal receiving interval of the GPS receiver shortly before the wearer has moved the distance set in the distance setting means so as to increase the distance calculating accuracy of at least the distance calculating means.

4. A portable GPS signal receiving apparatus according to claim 1; further comprising signal receiving interval setting means for allowing external setting of the signal receiving interval of the GPS receiver at a desired interval; and signal receiving interval control means for controlling the signal receiving interval at which the GPS receiver periodically receives GPS location signals at the interval set in the signal receiving interval setting means.

5. A portable GPS signal receiving apparatus according to claim 1; further comprising notifying means for notifying the user that a calculated result has been displayed by providing at least one of an audible alarm and a vibratory alarm when displaying the result on the first display means or the second display means.

6. A portable GPS signal receiving apparatus according to claim 1; further comprising time of arrival calculating means for calculating an estimated time required by the user to move the predetermined moving distance based on the distance set in the distance setting means, the moving distance determined by the moving distance calculating means and the moving speed of the user obtained by the GPS signal receiver.

7. A portable GPS signal receiving apparatus according to claim 1; further comprising a housing adapted to be worn on the user's body for housing the apparatus.

8. A portable GPS signal receiving apparatus for receiving signals from GPS satellites comprising:

a portable GPS receiver for receiving GPS location signals and determining therefrom at least one of a location and a speed of a user of the receiver;

moving distance calculating means for calculating a distance moved by a user of the apparatus in accordance with one of a received GPS location signal and a speed signal derived from the received GPS location signal;

distance setting means for allowing the user to set a desired distance to be moved by the user;

time counting means for counting a time in response to a time count start instruction;

physiological information measuring means for measuring a physiological function of the user at predetermined intervals while the user is moving the distance set in the distance setting means;

physiological information calculating means for performing a calculating process on a result of measurement taken by the Physiological information measuring means during a period of time from the start of a time count by the time count means until the user has moved the set distance, the calculating processing being performed when it is determined that the user has reached the distance set in the distance setting means; and second display means for displaying a result of calculation of the physiological information calculating means.

9. A portable GPS signal receiving apparatus according to claim 8; further comprising correlation calculating means for determining a correlation between the user's moving speed and the physiological information from the physiological information calculated by the physiological information calculating means and the moving speed obtained by the GPS signal receiving apparatus; and pseudo speed calculating means for calculating the user's approximate moving speed based on the physiological information calculated by the physiological information calculating means and the correlation between the physiological information and the moving speed determined by the correlation calculating means.

10. A portable GPS signal receiving apparatus according to claim 8; further comprising signal receiving interval control means for controlling a signal receiving interval at which the GPS receiver periodically receives GPS signals in accordance with the distance set in the distance setting means.

11. A portable GPS signal receiving apparatus according to claim 8; further comprising signal receiving interval setting means for allowing external setting of the signal receiving interval of the GPS receiver at a desired interval; and signal receiving interval control means for controlling the signal receiving interval at which the GPS receiver periodically receives GPS location signals at the interval set in the signal receiving interval setting means.

12. A portable GPS signal receiving apparatus according to claim 8; further comprising notifying means for notifying the user that a calculated result has been displayed by providing at least one of an audible alarm and a vibratory alarm when displaying the result on the first display means or the second display means.

13. A portable GPS signal receiving apparatus according to claim 8; further comprising time of arrival calculating means for calculating an estimated time required by the user to move the predetermined moving distance based on the distance set in the distance setting means, the moving distance determined by the moving distance calculating means and the moving speed of the user obtained by the GPS signal receiver.

14. A portable GPS signal receiving apparatus according to claim 8; further comprising a housing adapted to be worn on the user's body for housing the apparatus.

15. A portable movement monitor comprising:
- locating means for determining a location of the movement monitor as it is moved by a user;
- moving distance calculating means for calculating a distance moved by the user of the movement monitor;
- distance setting means for allowing the user to set a desired distance to be moved by the user along with the monitor;
- time counting means for counting elapsed time the user moves until the desired distance set in the distance setting means has been reached; and
- a display for displaying the elapsed time.

16. A portable movement monitor according to claim 15; wherein the locating means comprises a portable GPS receiver for receiving GPS location signals and determining therefrom at least one of a location and a speed of the user.

17. A portable movement monitor according to claim 16; wherein the moving distance calculating means includes means for calculating the distance moved by the user in accordance with one of a received GPS location signal and the speed of the user derived from the received GPS location signal.

18. A portable movement monitor according to claim 15; wherein the time counting means is responsive to a time count instruction issued by the user to count elapsed time.

19. A portable movement monitor according to claim 18; further comprising time count calculating means for calculating an elapsed time from receipt of the time count start instruction of the time count means, to a completion time when the user has moved the distance set in the distance setting means.

20. A portable movement monitor according to claim 15; further comprising physiological information measuring means for measuring a physiological function of the user at predetermined intervals while the user is moving the distance set in the distance setting means; and physiological information calculating means for performing a calculating process on a result of measurement, from the start of a time count by the time count means until the user has moved the set distance, of the physiological information measuring means when it has been determined that the user has reached the distance set in the distance setting means; wherein the display includes means for displaying a calculation result of the physiological information calculating means.

* * * * *